United States Patent
Yu et al.

(10) Patent No.: US 7,893,589 B2
(45) Date of Patent: Feb. 22, 2011

(54) AC-INDUCTION-MOTOR ROTOR LAMINATION HAVING ROTOR SLOTS

(75) Inventors: Johnny D. Yu, Centerville, OH (US); Joseph A. Zahora, Kettering, OH (US)

(73) Assignee: Dayton-Phoenix Group, Inc., Dayton, OH (US)

( * ) Notice: Subject to any disclaimer, the term of this patent is extended or adjusted under 35 U.S.C. 154(b) by 122 days.

(21) Appl. No.: 12/255,863

(22) Filed: Oct. 22, 2008

(65) Prior Publication Data

US 2010/0052464 A1 Mar. 4, 2010

Related U.S. Application Data

(60) Provisional application No. 61/093,859, filed on Sep. 3, 2008.

(51) Int. Cl.
*H02K 17/00* (2006.01)

(52) U.S. Cl. .................................. 310/211; 310/216.93

(58) Field of Classification Search ................ 310/211, 310/261.1, 216.93–216.96
See application file for complete search history.

(56) References Cited

U.S. PATENT DOCUMENTS

| | | | | |
|---|---|---|---|---|
| 1,524,558 A | * | 1/1925 | Kincaid | 310/211 |
| 1,549,684 A | * | 8/1925 | Punga | 318/766 |
| 1,680,688 A | * | 8/1928 | Maxwell | 318/819 |
| 1,695,799 A | * | 12/1928 | Daun | 29/598 |
| 2,087,406 A | * | 7/1937 | Hutchins | 310/211 |
| 2,138,661 A | * | 11/1938 | Maxwell | 29/598 |
| 2,175,915 A | * | 10/1939 | Potter | 310/211 |
| 2,176,871 A | * | 10/1939 | Harrell et al. | 310/211 |
| 2,304,067 A | * | 12/1942 | Anderson | 164/493 |
| 2,386,138 A | * | 10/1945 | Pancher | 310/211 |
| 2,486,798 A | * | 11/1949 | Mollenhauer | 29/598 |
| 2,993,136 A | | 7/1961 | Richer et al. | |
| 3,113,230 A | | 12/1963 | Linkous | |
| 3,371,410 A | | 3/1968 | Gintovt | |
| 3,457,445 A | | 7/1969 | Dochterman | |
| 4,025,840 A | | 5/1977 | Brissey et al. | |
| 4,585,967 A | * | 4/1986 | Mayer et al. | 310/216.123 |
| 4,801,832 A | | 1/1989 | Neumann | |
| RE34,667 E | | 7/1994 | Neumann | |
| 5,548,172 A | * | 8/1996 | Kliman et al. | 310/156.53 |
| 7,218,021 B2 | | 5/2007 | Nilson | |
| 2003/0048024 A1 | | 3/2003 | Chu | |

* cited by examiner

*Primary Examiner*—Thanh Lam
(74) *Attorney, Agent, or Firm*—Thompson Hine LLP

(57) ABSTRACT

An AC-induction-motor rotor lamination has a longitudinal axis and circumferentially spaced apart and closed rotor slots. Each rotor slot includes first through fifth corners, a straight slot base, straight first and second slot sides, and first and second curved sides. The slot base extends from the first corner to the second corner, the first slot side extends substantially radially inward from the second corner to the third corner, and the second slot side extends substantially radially inward from the first corner to the fourth corner. The first and second curved sides extend from a corresponding one of the third and fourth corners to the fifth corner. A rotor lamination having slot sides extending substantially radially outwardly from the second and first corners, and rotor laminations having open rotor slots (with slot sides extending substantially radially inward or outward) are also described.

5 Claims, 6 Drawing Sheets

AC-INDUCTION-MOTOR ROTOR LAMINATION HAVING ROTOR SLOTS

CROSS REFERENCE TO RELATED APPLICATIONS

The present application claims priority of U.S. Provisional Application No. 61/093,859 filed Sep. 3, 2008.

TECHNICAL FIELD

The present invention relates generally to AC (alternating current) induction motors, and more particularly to an AC-induction-motor rotor lamination having rotor slots.

BACKGROUND OF THE INVENTION

Conventional ac-induction-motors include rotors which surround or are surrounded by a stator. In a known design, the rotor includes a stack of identical and aligned steel rotor laminations each having an array of circumferentially spaced apart rotor slots. The rotor slots are filled with an aluminum alloy or copper. The rotor lamination is manufactured with closed slots. For some applications, the rotor lamination stack is machined to remove a small radial length of material to create open slots exposing the aluminum alloy or copper, wherein the slot opening has a small width, and wherein each rotor lamination in the machined stack may be referred to as a rotor lamination having open rotor slots. A slot designed for a stator is not suitable to be a slot designed for a rotor. A rotor slot design which improves motor performance for one motor application typically will not improve motor performance for at least one other motor application.

Existing open rotor slot designs dramatically increase the width of the slot opening with a very small increase in radial length of removed material resulting in large variations in the width of the slot opening in production rotors. For some motor applications, such as those motors receiving voltage from a DC (direct current) to AC inverter, large variations in the width of the slot opening will result in undesired variations in motor performance in production motors.

What is needed is an improved AC-induction-motor rotor lamination having rotor slots.

SUMMARY OF THE INVENTION

An expression of a first embodiment of the invention is for apparatus including an AC-induction-motor rotor lamination having a central longitudinal axis and a plurality of circumferentially spaced apart rotor slots. The rotor slots are closed, and adjacent rotor slots define a rotor tooth. Each rotor slot includes first through fifth corners, a straight slot base, straight first and second slot sides, and first and second curved sides. The slot base extends from the first corner to the second corner and has a midpoint, wherein the slot base is perpendicular to a first radius from the central longitudinal axis to the midpoint of the slot base. The first slot side extends substantially radially toward the central longitudinal axis from the second corner to the third corner. The third and fourth corners are disposed a same radial distance from the central longitudinal axis. The second slot side extends substantially radially toward the central longitudinal axis from the first corner to the fourth corner. The fifth corner is centered on the first radius. The first curved side extends a first curved length from the third corner to the fifth corner, wherein the first curved side is convex as seen from inside the rotor slot, and wherein any radius from the central longitudinal axis to the first curved side will intersect only a single point on the first curved side. The second curved side extends a second curved length from the fourth corner to the fifth corner, wherein the second curved side is convex as seen from inside the rotor slot, and wherein any radius from the central longitudinal axis to the second curved side will intersect only a single point on the second curved side. The rotor slots include circumferentially adjacent first and second rotor slots, wherein the first slot side of the first rotor slot is parallel to the second slot side of the second rotor slot.

An expression of a second embodiment of the invention is for apparatus including an AC-induction-motor rotor lamination having a central longitudinal axis and a plurality of circumferentially spaced apart rotor slots. The rotor slots are closed, and adjacent rotor slots define a rotor tooth. Each rotor slot is identical to each rotor slot of the previously-described expression of the first embodiment, except that the first and second slot sides extend substantially radially away from the central longitudinal axis instead of extending substantially radially toward the central longitudinal axis.

An expression of a third embodiment of the invention is for apparatus including an AC-induction-motor rotor lamination having a central longitudinal axis and a plurality of circumferentially spaced apart rotor slots. The rotor slots are open, and adjacent rotor slots define a rotor tooth. Each rotor slot is identical to each rotor slot of the previously-described expression of the first embodiment, except that "rotor slot opening" replaces "fifth corner" and "the first (second) curved side is convex, as seen from inside the rotor slot, from the third (fourth) corner to proximate the rotor-slot opening" replaces "the first (second) curved side is convex as seen from inside the rotor slot".

An expression of a fourth embodiment of the invention is for apparatus including an AC-induction-motor rotor lamination having a central longitudinal axis and a plurality of circumferentially spaced apart rotor slots. The rotor slots are open, and adjacent rotor slots define a rotor tooth. Each rotor slot is identical to each rotor slot of the previously-described expression of the third embodiment, except that the first and second slot sides extend substantially away from the central longitudinal axis instead of extending substantially radially toward the central longitudinal axis.

Several benefits and advantages are derived from one or more or all of the expressions of embodiments of the invention. In one example, the rotor slot shape allows for increased tooth width, increased slot area, and reduced slot length for a given number of rotor slots and a given inside and outside rotor diameter which should improve motor performance for certain motor applications such as a motor application wherein the motor receives voltage from a DC-to-AC inverter. In one illustration of the expression of the third and/or fourth embodiments, the width of the slot opening varies very little with production variations in the radial length of removed material to open the originally-closed slots which should improve motor performance for certain motor applications such as a motor application wherein the motor receives voltage from a DC-to-AC inverter.

DETAILED DESCRIPTION

Figure 1:
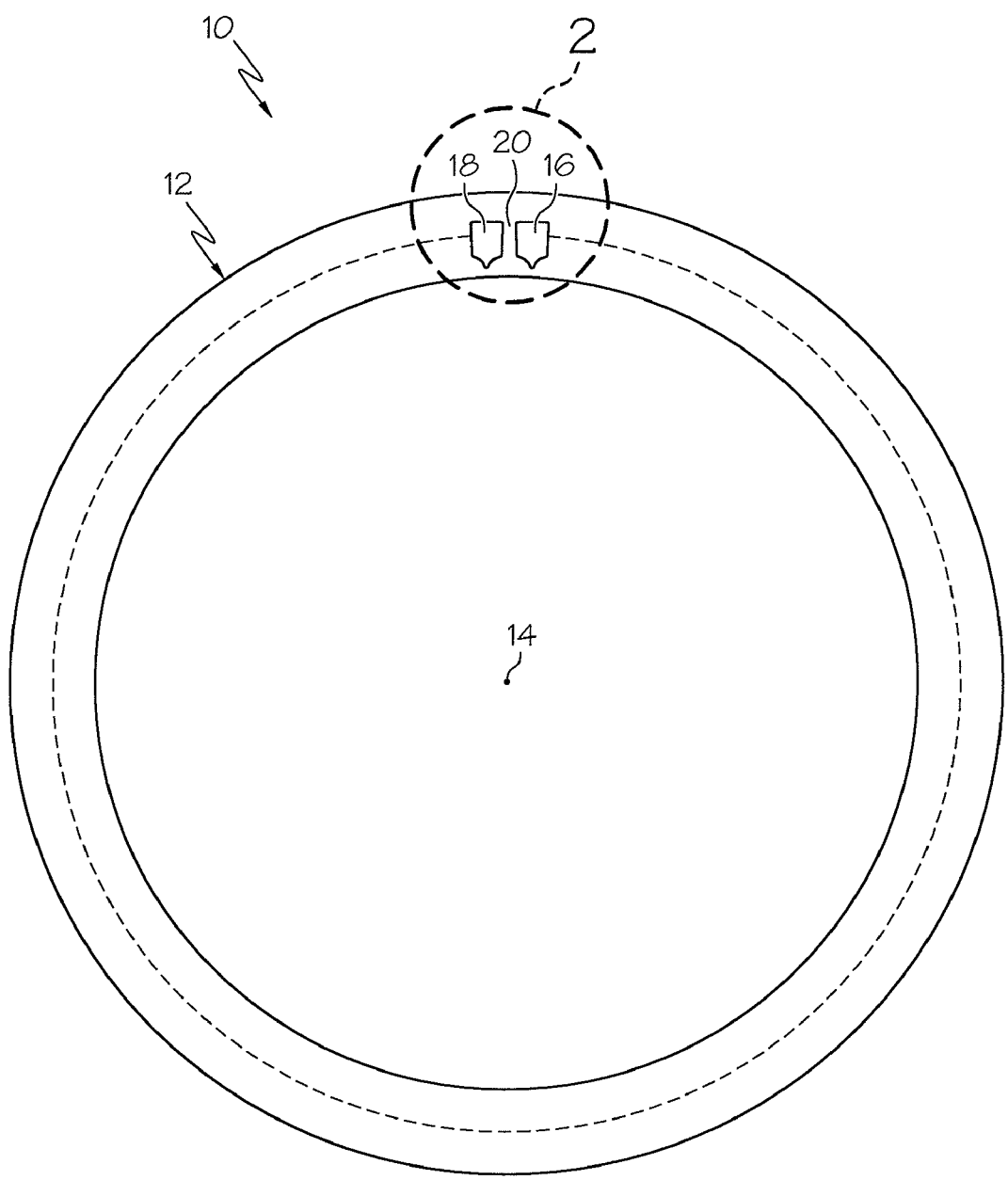
FIG. 1 is a top planar view of a first embodiment of an AC-induction-motor rotor lamination having closed rotor slots and designed to surround a motor stator, wherein only two slots, which are not drawn to scale are shown.
Figure 2:
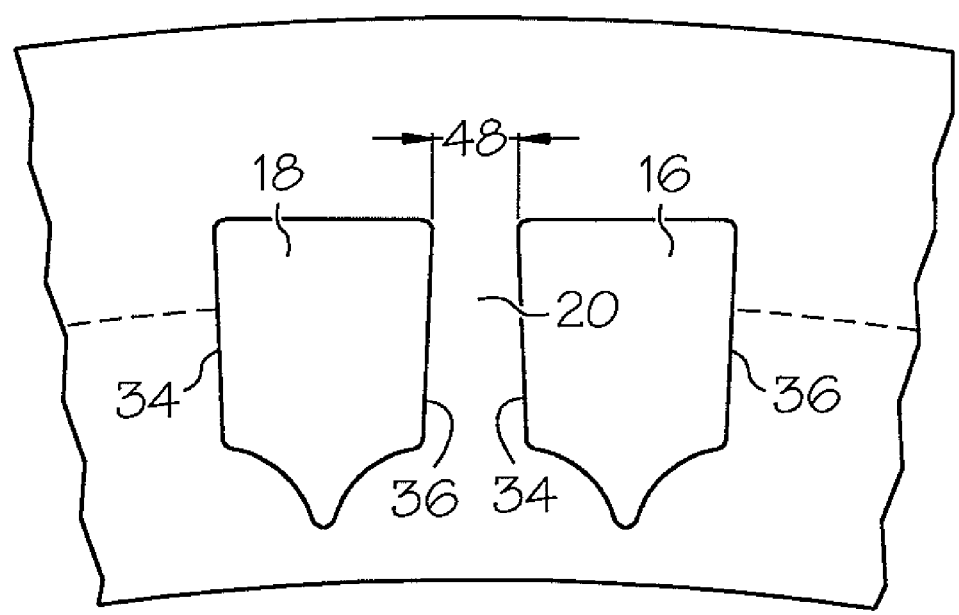
FIG. 2 is an enlarged view of an area of the rotor lamination of FIG. 1 showing two circumferentially adjacent rotor slots.
Figure 3:
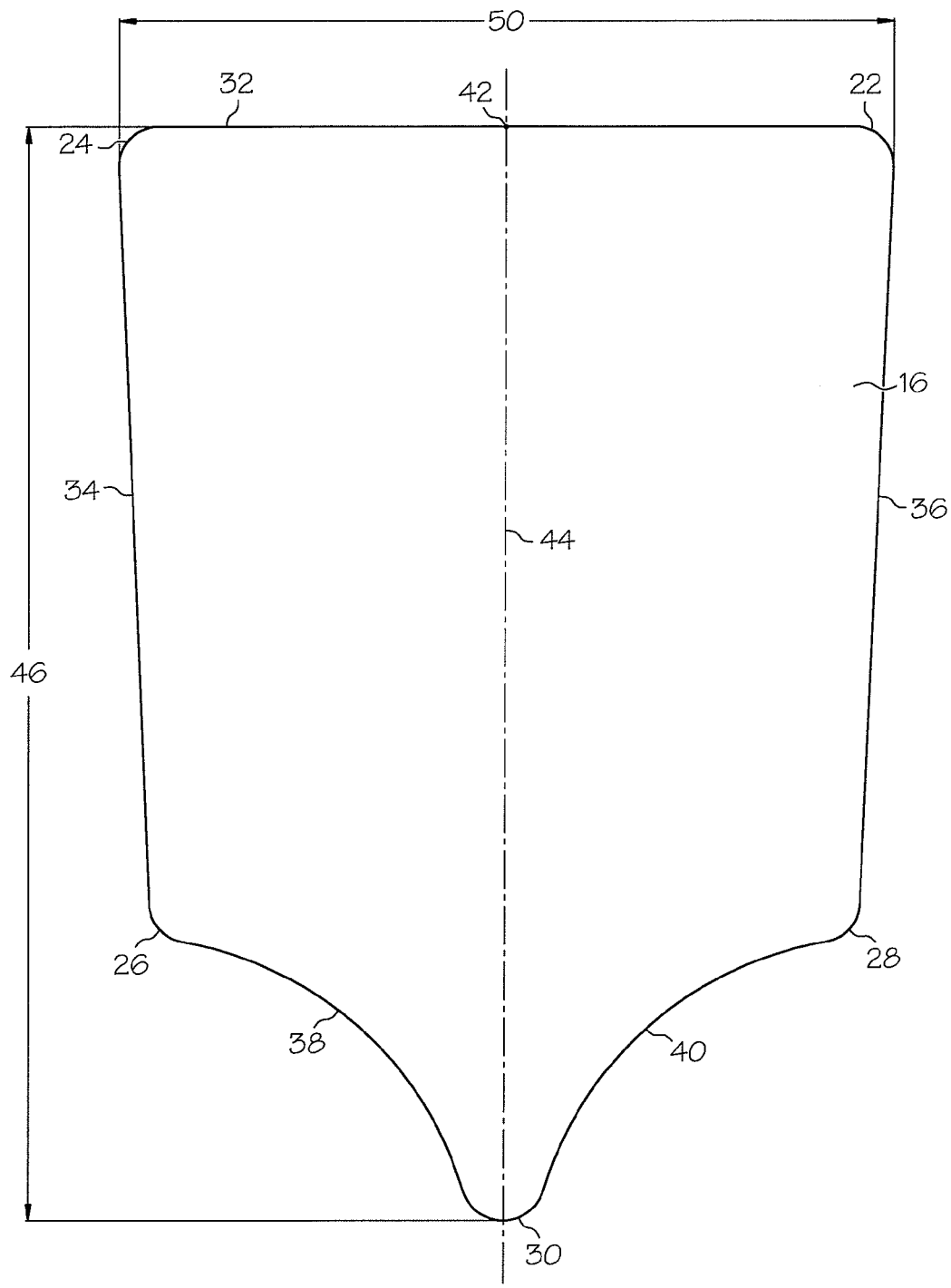
FIG. 3 is an enlarged view of an area of the rotor lamination of FIG. 2 showing one rotor slot.

Referring now to the drawings, FIGS. 1-3 show a first embodiment of the present invention. An expression of the embodiment of FIGS. 1-3 is for apparatus 10 including an AC-induction-motor rotor lamination 12 having a central longitudinal axis 14 (seen as a point in FIG. 1) and a plurality of circumferentially spaced apart rotor slots 16 and 18. The rotor slots 16 and 18 are closed, and adjacent rotor slots 16 and 18 define a rotor tooth 20. Each rotor slot (e.g., 16) includes first through fifth corners 22, 24, 26, 28 and 30, a straight slot base 32, straight first and second slot sides 34 and 36, and first and second curved sides 38 and 40. The slot base 32 extends from the first corner 22 to the second corner 24 and has a midpoint 42, wherein the slot base 32 is perpendicular to a first radius 44 from the central longitudinal axis 14 to the midpoint 42 of the slot base 32. The first slot side 34 extends substantially radially toward the central longitudinal axis 14 from the second corner 24 to the third corner 26. The third and fourth corners 24 and 26 are disposed a same radial distance from the central longitudinal axis 14. The second slot side 36 extends substantially radially toward the central longitudinal axis 14 from the first corner 22 to the fourth corner 28. The fifth corner 30 is centered on the first radius 44. The first curved side 38 extends a first curved length from the third corner 26 to the fifth corner 30, wherein the first curved side 38 is convex as seen from inside the rotor slot 16, and wherein any radius from the central longitudinal axis 14 to the first curved side 38 will intersect only a single point on the first curved side 38. The second curved side 40 extends a second curved length from the fourth corner 28 to the fifth corner 30, wherein the second curved side 40 is convex as seen from inside the rotor slot 16, and wherein any radius from the central longitudinal axis 14 to the second curved side 40 will intersect only a single point on the second curved side 40. The rotor slots 16 and 18 include circumferentially adjacent first and second rotor slots 16 and 18, wherein the first slot side 34 of the first rotor slot 16 is parallel to the second slot side 36 of the second rotor slot 18.

It is noted that by "substantially radially" is meant radially plus or minus up to five degrees.

In one enablement of the expression of the embodiment of FIGS. 1-3, the first, second, third, fourth, and fifth corners 22, 24, 26, 28 and 30 are concave as seen from inside the rotor slot (e.g., 16). In one variation, the first curved side 38 has a shape of a circular arc, and the second curved side 40 is a mirror image of the first curved side 38 about the first radius 44. In one modification, the first, second, third, fourth, and fifth corners 22, 24, 26, 28 and 30 each have a shape of a circular arc. In one instance, the circular arcs of the first, second, third, and fourth corners 22, 24, 26 and 28 are identical in size and shape, and the radius of the circular arc of the fifth corner 30 is greater than the radius of the circular arc of the first corner 22.

In one implementation of the expression of the embodiment of FIGS. 1-3, the rotor lamination 12 consists essentially of electrical steel, a plurality of identical rotor laminations 12 are stacked together and aligned, and each rotor slot (e.g., 16 and 18) is filled with an aluminum alloy or copper. Other choices of material are left to the artisan.

In one motor application, an AC induction motor includes a rotor having the rotor lamination 12, and a DC-to-AC inverter which supplies voltage to the motor. In this application, the AC induction motor can be referred to as an inverter duty AC induction motor, and the rotor lamination 12 can be referred to as an inverter duty AC-induction-motor rotor lamination. Other motor applications are left to the artisan. In one construction, the rotor slots 16 and 18 are identical, and the teeth 20 between adjacent rotor slots 16 and 18 are identical.

Figure 4:
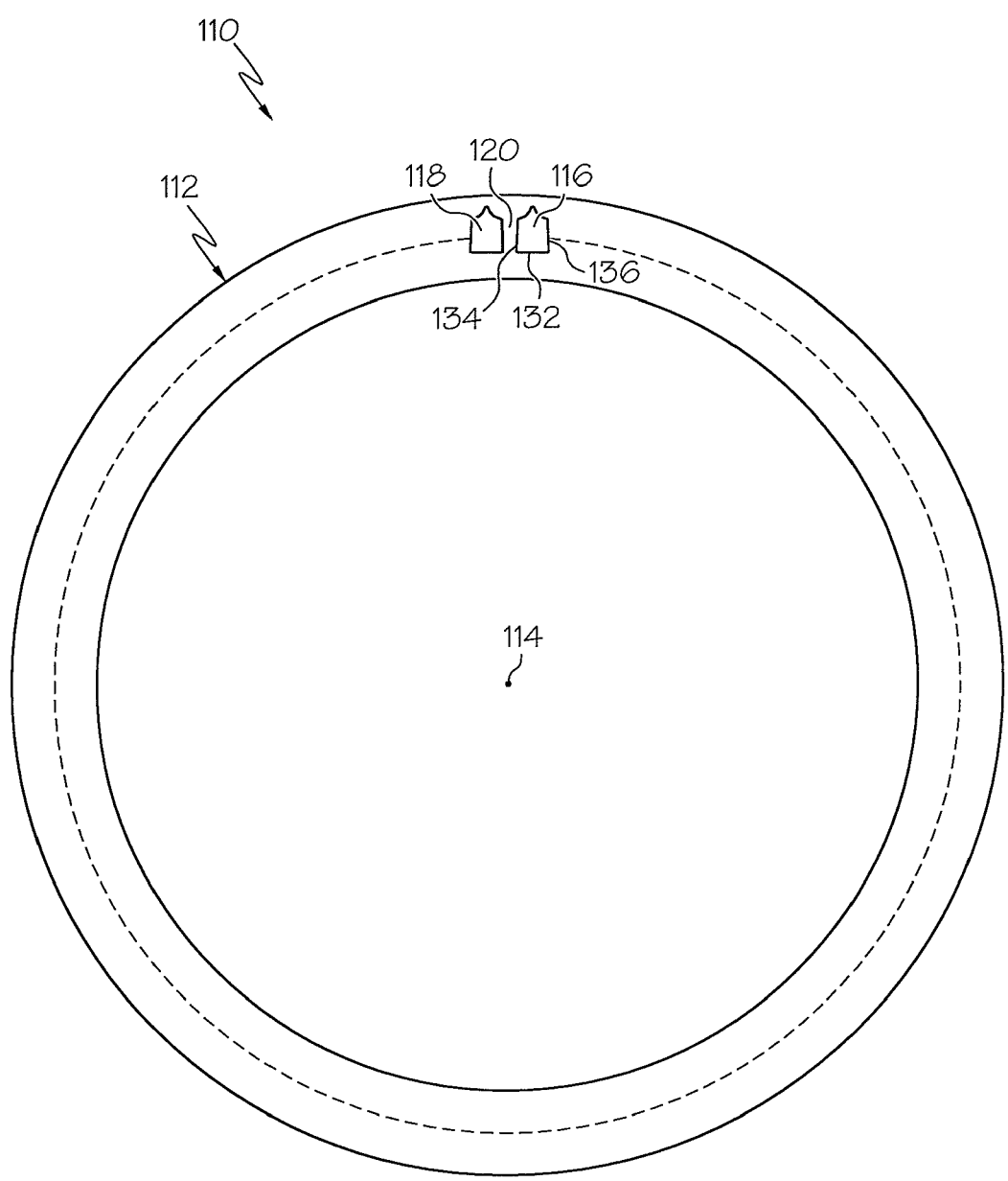
FIG. 4 is a view, as in FIG. 1, but of a second embodiment of an AC-induction-motor rotor lamination having closed rotor slots and designed to be surrounded by a motor stator.

A second embodiment of the invention is shown in FIG. 4. An expression of the embodiment of FIG. 4 is for apparatus 110 including an AC-induction-motor rotor lamination 112 having a central longitudinal axis 114 and a plurality of circumferentially spaced apart rotor slots 116 and 118. The rotor slots 116 and 118 are closed, and adjacent rotor slots 116 and 118 define a rotor tooth 120. Each rotor slot 116 and 118 is identical to each rotor slot 16 and 18 of the previously-described expression of the first embodiment, except that the first and second slot sides 134 and 136 of the expression of the second embodiment extend substantially radially away from the central longitudinal axis 114 instead of, as in the first embodiment, having the first and second slot sides 34 and 36 extend substantially radially toward the central longitudinal axis 14. The enablements, implementations, etc. of the expression of the first embodiment are equally applicable to the expression of the second embodiment.

Figure 5:
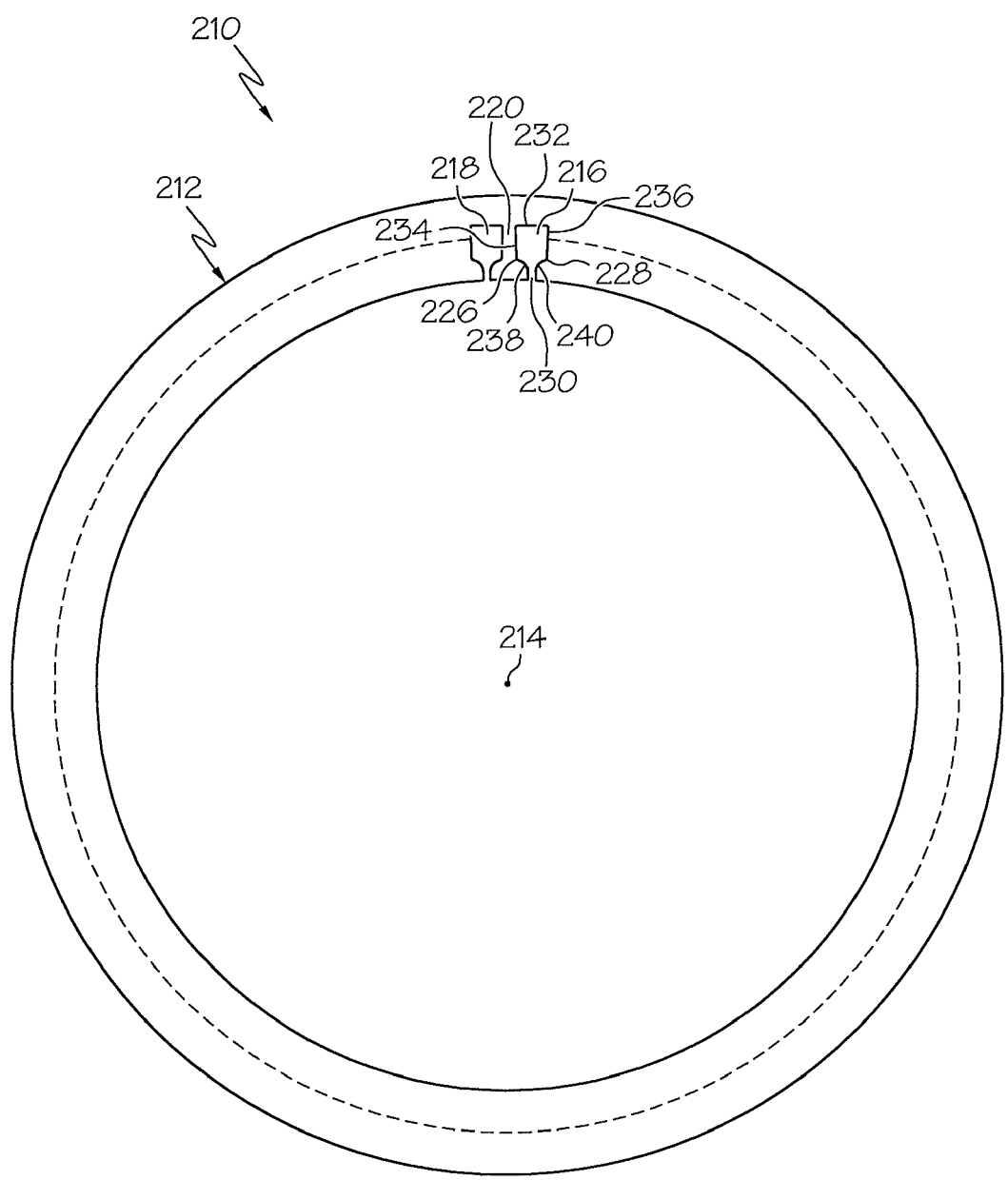
FIG. 5 is a view, as in FIG. 1, but of a third embodiment of an AC-induction-motor rotor lamination having open rotor slots and designed to surround a motor stator.

A third embodiment of the invention is shown in FIG. 5. An expression of the embodiment of FIG. 5 is for apparatus 210 including an AC-induction-motor rotor lamination 212 having a central longitudinal axis 214 and a plurality of circumferentially spaced apart rotor slots 216 and 218. The rotor slots 216 and 218 are open, and adjacent rotor slots 216 and 218 define a rotor tooth 220. Each rotor slot 216 and 218 is identical to each rotor slot 16 and 18 of the previously-described expression of the first embodiment, except that "rotor slot opening 230" replaces "fifth corner 30" and "the first (second) curved side 238 (240) is convex, as seen from inside the rotor slot 216 and 218, from the third (fourth) corner 26 (28) to proximate the rotor-slot opening 230" replaces "the first (second) curved side 38 (40) is convex as seen from inside the rotor slot 16 and 18". The enablements, implementations, etc. of the expression of the first embodiment are equally applicable to the expression of the third embodiment.

Figure 6:
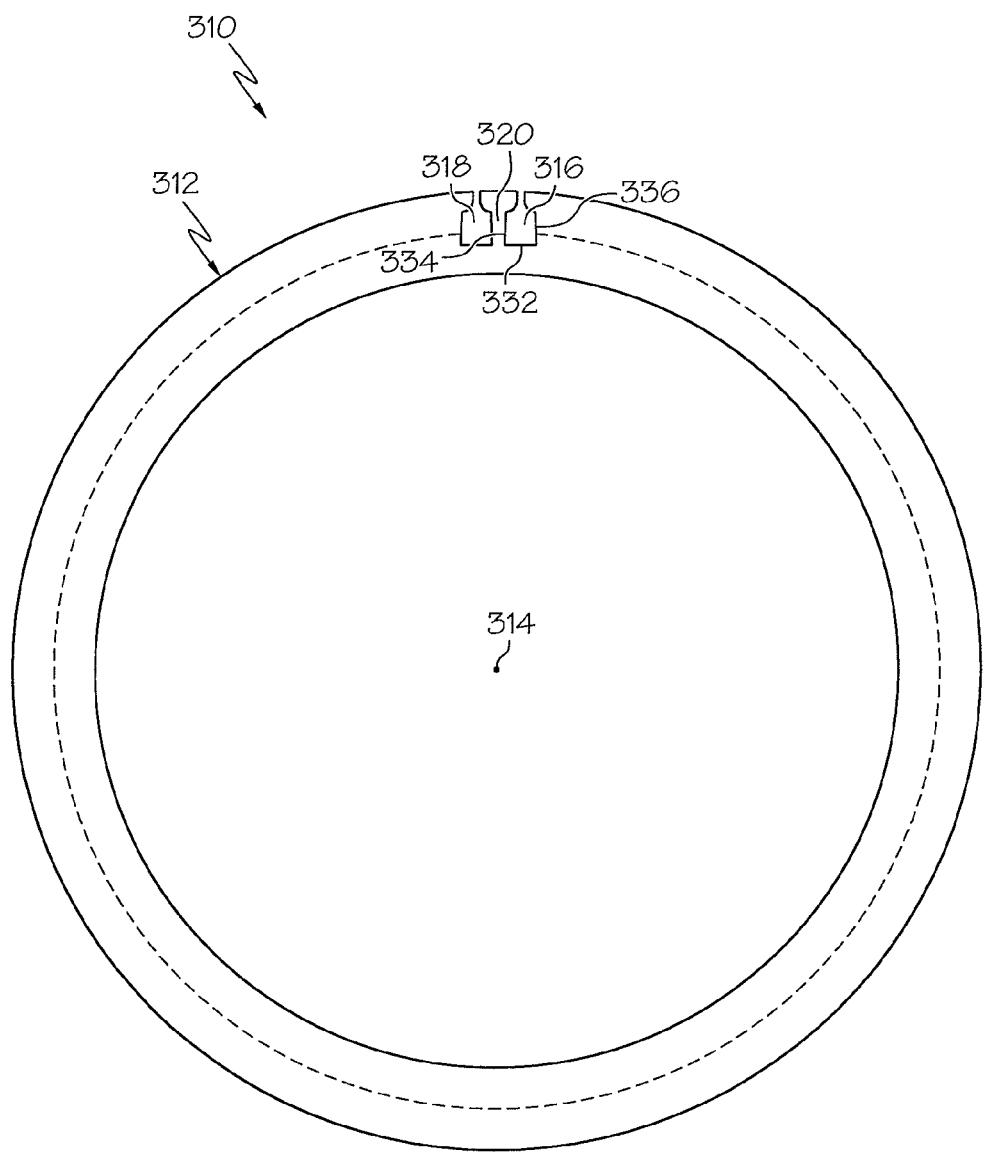
FIG. 6 is a view, as in FIG. 1 but of a fourth embodiment of an AC-induction-motor rotor lamination having open rotor slots and designed to be surrounded by a motor stator.

A fourth embodiment of the invention is shown in FIG. 6. An expression of the embodiment of FIG. 6 is for apparatus 310 including an AC-induction-motor rotor lamination 312 having a central longitudinal axis 314 and a plurality of circumferentially spaced apart rotor slots 316 and 318. The rotor slots 316 and 318 are open, and adjacent rotor slots 316 and 318 define a rotor tooth 320. Each rotor slot 316 and 318 is identical to each rotor slot 216 and 218 of the previously-described expression of the third embodiment, except that the first and second slot sides 334 and 336 of the expression of the second embodiment extend substantially radially away from the central longitudinal axis 314 instead of, as in the third embodiment, having the first and second slot sides 234 and 236 extend substantially radially toward the central longitudinal axis 214. The enablements, implementations, etc. of the expression of the third embodiment are equally applicable to the expression of the fourth embodiment.

In one implementation of the previously-described expressions of embodiments, input parameters describing the AC-induction-motor rotor lamination 12, including describing the size and specific shape of the rotor slots 16 and 18, are entered into a motor performance computer simulation program, and the output of calculated performance factors is analyzed. In one example, input parameters include, without limitation, the inside and outside diameters of the rotor lamination 12, the number of rotor slots 16 and 18, the length of the slot base 32, the radius of the first and second corners 22 and 24, etc. In one example, output parameters include, without limitation, lock rotor torque, breakdown torque, etc.

Analysis of the calculated performance factors for a multitude of different choices (chosen by those skilled in the art) of the input parameters to the motor performance computer simulation program results in specific dimensions of the slot base 32, slot sides 34 and 36, curved sides 38 and 40, and corners 22, 24, 26, 28 and 30 which will, in one illustration, maximize motor performance for a particular motor application. For the inverter duty rotor lamination, this will, in one example, maximize the area of the rotor slot (e.g., 16), minimize slot length 46, and maximize tooth width 48 for a rotor lamination 12 having a given number of rotor slots 16 and a given inside and outside diameter of the rotor lamination 12. In one construction, the rotor lamination 12 has a thickness of 0.0185 inches, an outside diameter of 18.528 inches, an inside diameter of 15.330 inches, and 87 equally spaced slots.

One example of a motor performance computer simulation program is PC-IMD 3.5 which is the A.C. Induction Motor Design Simulation Software known as SPEED and which is available from Motorsoft located at 3000 M Henkle Drive, Lebanon, Ohio 45036.

Several benefits and advantages are derived from one or more or all of the expressions of embodiments of the invention. In one example, the rotor slot shape allows for increased tooth width, increased slot area, and reduced slot length for a given number of rotor slots and a given inside and outside rotor diameter which should improve motor performance for certain motor applications such as a motor application wherein the motor receives voltage from a DC-to-AC inverter. In one illustration of the expression of the third and/or fourth embodiments, the width of the slot opening varies very little with production variations in the radial length of removed material to open the originally-closed slots which should improve motor performance for certain motor applications such as a motor application wherein the motor receives voltage from a DC-to-AC inverter.

The foregoing description of expressions of embodiments has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. Apparatus comprising an AC-induction-motor rotor lamination having a central longitudinal axis and a plurality of circumferentially spaced apart rotor slots, wherein the rotor slots are open, wherein adjacent rotor slots define a rotor tooth, and wherein each rotor slot includes:
   first and second corners,
   a straight slot base extending from the first corner to the second corner and having a midpoint, wherein the slot base is perpendicular to a first radius from the central longitudinal axis to the midpoint of the slot base,
   a third corner,
   a straight first slot side extending substantially radially toward the central longitudinal axis from the second corner to the third corner,
   a fourth corner, wherein the third and fourth corners are disposed a same radial distance from the central longitudinal axis,
   a straight second slot side extending substantially radially toward the central longitudinal axis from the first corner to the fourth corner,
   a rotor-slot opening centered on the first radius,
   a first curved side extending a first curved length from the third corner to the rotor-slot opening, wherein the first curved side is convex, as seen from inside the rotor slot, from the third corner to proximate the rotor-slot opening, and wherein any radius from the central longitudinal axis to the first curved side will intersect only a single point on the first curved side,
   a second curved side extending a second curved length from the fourth corner to the rotor-slot opening, wherein the second curved side is convex, as seen from inside the rotor slot, from the fourth corner to proximate the rotor-slot opening, and wherein any radius from the central longitudinal axis to the second curved side will intersect only a single point on the second curved side, and
   wherein the rotor slots include circumferentially adjacent first and second rotor slots, wherein the first slot side of the first rotor slot is parallel to the second slot side of the second rotor slot.

2. The apparatus of claim 1, wherein the first, second, third and fourth corners are concave as seen from inside the rotor slot.

3. The apparatus of claim 2, wherein the first curved side has a shape of a circular arc, and wherein the second curved side is a mirror image of the first curved side about the first radius.

4. The apparatus of claim 3, wherein the first, second, third and fourth corners each have a shape of a circular arc.

5. The apparatus of claim 4, wherein the circular arcs of the first, second, third, and fourth corners are substantially identical in size and shape.

* * * * *